(12) United States Patent
Kuderer

(10) Patent No.: US 6,608,293 B2
(45) Date of Patent: Aug. 19, 2003

(54) METHOD OF AND APPARATUS FOR TESTING A PHOTOSENSOR

(75) Inventor: Hubert Kuderer, Waldbronn (DE)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

(21) Appl. No.: 09/738,899

(22) Filed: Dec. 18, 2000

(65) Prior Publication Data

US 2001/0013572 A1 Aug. 16, 2001

(30) Foreign Application Priority Data

Dec. 17, 1999 (DE) .......................... 199 60 910
Dec. 1, 2000 (EP) ............................ 00126241

(51) Int. Cl.$^7$ ............................................. H01J 41/14
(52) U.S. Cl. ....................... 250/200; 250/228; 250/216
(58) Field of Search ................... 250/205, 228, 250/216, 214 R, 20 D; 315/182, 183, 181; 356/230, 236

(56) References Cited

U.S. PATENT DOCUMENTS

| | | | |
|---|---|---|---|
| 4,868,383 A | * | 9/1989 | Kurtz et al. ............ 250/228 |
| 5,489,771 A | * | 2/1996 | Beach et al. ........... 250/205 |
| 5,525,810 A | | 6/1996 | Jewell et al. |
| 5,753,903 A | * | 5/1998 | Mahaney ............... 250/205 |

FOREIGN PATENT DOCUMENTS

| | | |
|---|---|---|
| DE | 44 05 895 C2 | 2/1994 |
| DE | 44 22 580 C1 | 6/1994 |

OTHER PUBLICATIONS

Patent Abstract SU 1083137, 1984.

* cited by examiner

Primary Examiner—Kevin Pyo

(57) ABSTRACT

The invention concerns a method and device to carry out the method to provide quality control for a photosensor, especially a photodiode array, whose output signal depends on the intensity of an input signal formed by electromagnetic waves. The photosensor to be tested receives stimulation signals forming the input signals while the stimulation signal intensity of the stimulation signals is varied. The associated output signals of the photosensor to be tested are measured and recorded for evaluation purposes. The photosensor preferably receives at least two independently controllable, superposed individual stimulation signals with individual intensities. The different stimulation signal intensities of the individual stimulation signals are set with the aid of a controller coupled to stimulation signal source, and the output signals of the photosensor are measured and recorded using a measurement data recorder unit.

40 Claims, 4 Drawing Sheets

Data_a

Data_d

Data_t

METHOD OF AND APPARATUS FOR TESTING A PHOTOSENSOR

Figure 1:
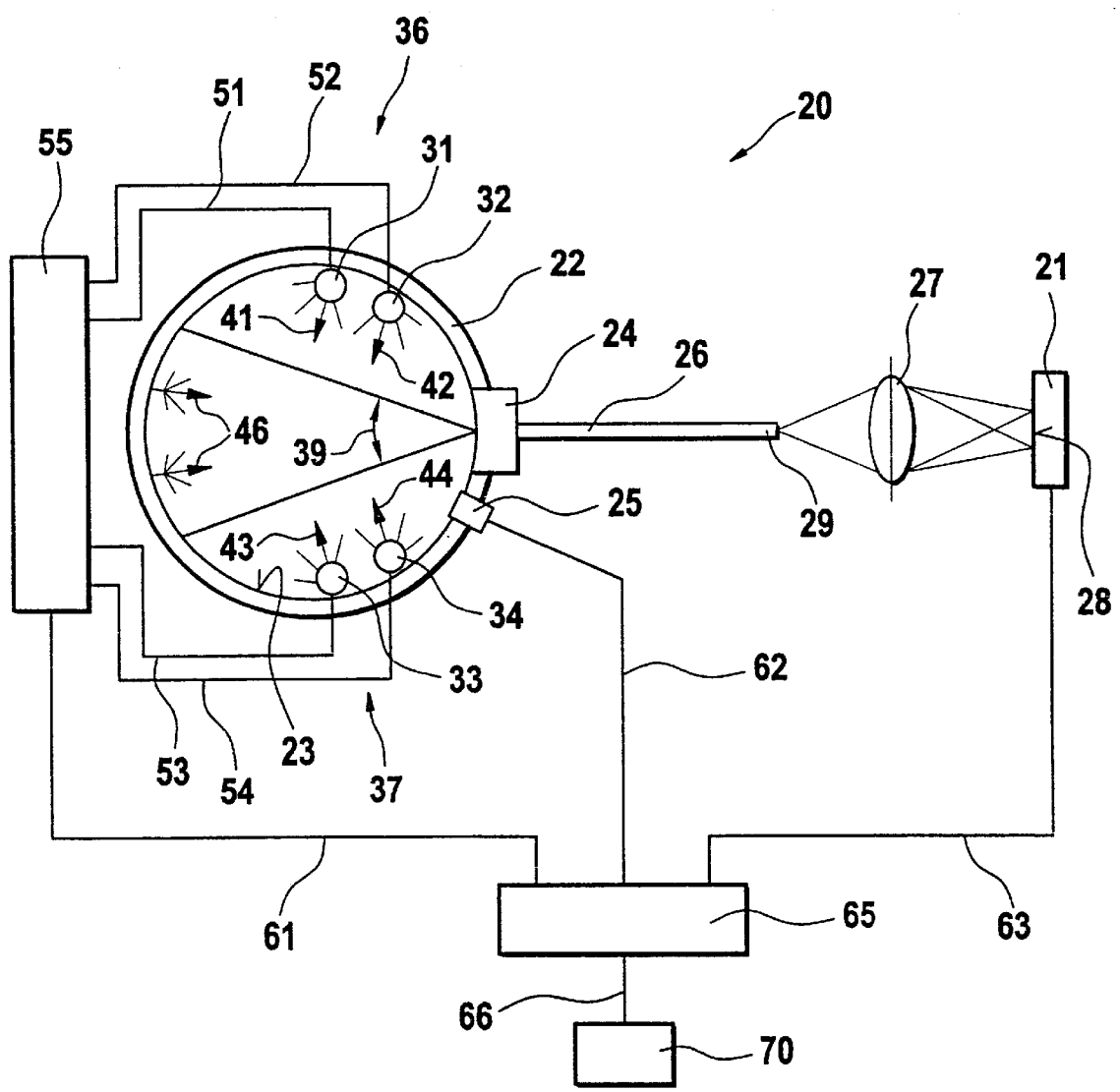

The inventions concerns a device and method to provide quality control for a photosensor, especially a photodiode array or a photodiode matrix, whose output signal depends on the intensity of an input signal formed by electromagnetic waves, whereby the photosensor to be tested receives stimulation signals forming the input signals while the stimulation signal intensity of the stimulation signals is varied, and whereby the associated output signals of the photosensor to be tested are measured and recorded for evaluation purposes.

Photosensors, especially photodiode arrays, are for example used in spectrometers, color measuring systems, scanners and pattern recognition systems. A photodiode array is formed by a linear arrangement of photosensitive elements, and it generates output signals that are a measure of the light intensity received by the individual photosensitive elements. Numerous different types of such photodiode arrays are obtainable. Simple types consist of just one arrangement of a number of photodiodes with either conventional anodes or cathodes, whereby the individual photodiodes are connected by separate terminal posts for the output signals. To improve the signal precision and/or improve the usefulness or user suitability, the photodiode arrays on chips or wafers have been developed into integrated photodiode arrays with greater functionality. Of particular interest are "active pixel sensors" (APS). Their particular feature is that increasingly complex circuit elements are assigned to each pixel (i.e., each photosensor element). Such active circuit elements can have functions that range from amplification to digitalizing circuit functions. Two main types are differentiated: multiplex photodiode arrays and parallel photodiode arrays.

With multiplex photodiode arrays, specific electronic circuits are integrated on the chip that permit the photosignals to be read out and processed via a single signal path. Depending on the functionality created on the chip, the output signals are either analog or digital. The charges generated by the individual photodiodes are stored between the readout cycles in the connected capacitors via an integration interval. At the end of this integration interval, pixels are read out when the respective charges are transmitted sequentially to a common line via electronic switches. In this case, an A/D converter in the additional signal path is foreseen that sequentially converts the signals into digital values. Frequently, such A/D converters are already included in the silicon chip. Usually "successive approximation"-type converters are used, since they represent a favorable compromise between speed and complexity. Unfortunately with this type of converter, procedural variations frequently lead to differential non-linearity.

With parallel photodiode arrays, analog/digital converters for each photoelement are on the chips. The parallel photodiode arrays provide simultaneously generated digital output signals that are accessible either via serial or parallel bus systems. Thus such a sensor offers simultaneous operation which is very important in many applications. However, the complexity of this sensor is greater, and the frequency of defects accordingly increases during the manufacturing process.

In addition to photodiode arrays with a linear arrangement of photosensors, prior-art matrix photodiode arrays also exist. These have a flat structure, and the pixels are in rows and columns. Frequently, the sensors are used as camera chips or image sensors.

Increasing the functionality on the photosensor chips has made their design, handling and function increasingly complex. This also increases the probability of defects during the manufacturing process. Specialized tests must therefore be carried out to check the properties of such photosensors during the manufacturing process for quality control. This requires highly specialized optical stimulation signals and highly specialized test methods that satisfy the requirements for precision and test time. Typical photosensor properties to be tested and characterized are the input/output function concern integral and differential linearity, the response function or output signals as a function of the wave lengths, the noise or disturbance intensity as a function of the signal intensity of the input signals, and the uniformity or homogeneity of the response signals of each photoelement in the photodiode array. In addition, the mechanical limitations need to be considered, especially the accessibility of the photosensors during tests on the wafer level carried out during manufacture.

The input/output transmission function must be tested to provide quality control of such photosensors. An optical stimulus signal is generated that is applied to the sensor whose response or output signal is measured with varied input signal intensity. The respective stimulation signal intensity must be known in this context. This is determined with the aid of a reference sensor whose input/output transmission function is known. Normally a measurement is first made using the reference sensor that is mounted at the device position at which the photosensor to be tested will later be mounted.

As a first step, it is therefore necessary to measure and characterize the stimulation signal using the reference sensor. Then in a second step, the reference sensor must be removed and replaced with the photosensor to be tested (DUT). Then another measurement must be made using the same stimulation signal in regard to its time characteristic and intensity under the same test and environmental conditions. By measuring and recording the respective output signals for evaluation purposes, the results of both measurements can be compared which serves as a measure for the quality of the photosensor to be tested. It is necessary to make the two measurements (of the setpoints using the reference sensor and of the actual values using the photosensor to be tested (DUT)) one right after the other or, in any case, separated only by a brief interval. Otherwise, substantial uncertainty can sometimes arise from the intermediate change in environmental conditions or changed radiation pattern of the light source, for example due to aging over time. The calibration measurement therefore will also have to be repeated at certain intervals using the reference sensor, and the reference sensor and sensor to be tested (DUT) will have to be mounted and removed each time.

This conventional state of the art procedure has a series of problems and difficulties. Changing the sensor once or several times causes uncertainty from altering the precise three-dimensional position of the sensor that can produce corresponding measurement uncertainty or imprecision. Further uncertainty can arise from differences in the respective types of photosensors, i.e., the reference sensor and the sensors to be tested, and in the properties of the output signals and the measuring setup. The previously required installation and removal procedure leads to long test cycles and allows little or no automation in quality control.

In particular when measuring small changes in the stimulation signal intensity, for example in photometric measuring procedures using spectrometers, absorbance detectors, color measuring systems or in the case of absorption measurements, faults in differential linearity of the photosensors have a disturbing influence and are characterized by the differential linearity (DNL) of the photosensor to be tested. Such faults distort the measuring results and increase the quantization noise. DNL has been determined to date by making a small continuous change in the input signal and measuring the associated output signals.

Figure 5:
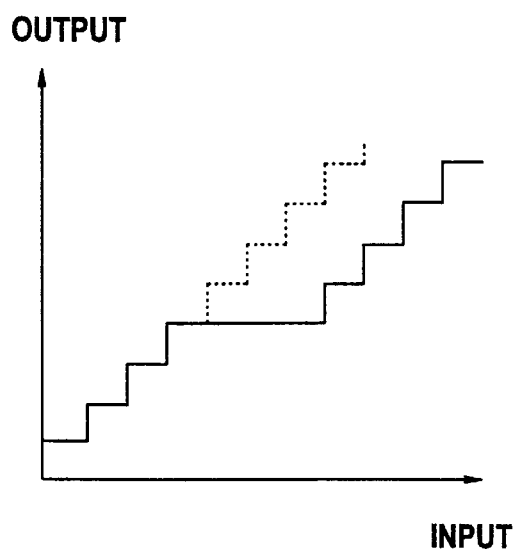
Figure 6:
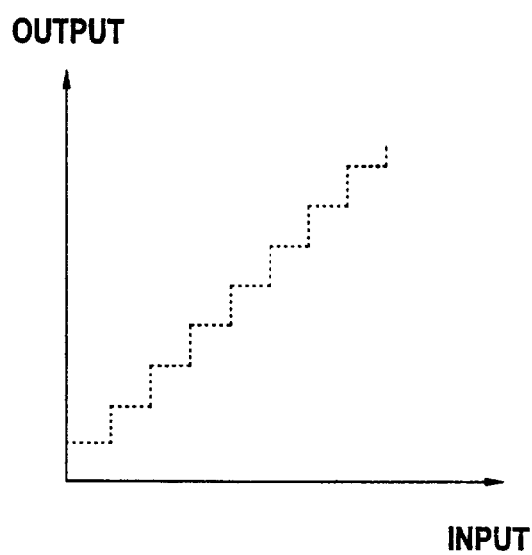

In the case of photosensors with digital output signals, DNL is defined as the deviation of the individual quantization steps from the average expected quantization step. This DNL can arise in the form of "missing codes" (FIG. 3), "double codes" (FIG. 4), or as a "dead zone" (FIG. 5). In contrast, FIG. 6 shows a fault-free input/output signal transmission function of a photosensor.

The DNL can be determined by comparing or referring the input signal to the output signal of the photosensor. To date, this has required the precise knowledge of the size of the input signal with a targeted control of the entire control range or else the size of the output signal must be determined by reference testing. Both procedures are very involved and time-intensive. It is very difficult to obtain the desired amplitude resolution, precision and stability of optical control signals (drift, temperature, local differences, etc.), and the insufficiency of optical reference formation is sometimes substantial. In the latter case, design-related features, differences in the characteristic of the sensor to be tested and of the reference sensor, and statistical uncertainty can have a very strong influence on the result. This is all the more the case as the sensor increases in size.

The problem of the invention is therefore to create a quality control method for photosensors and a device to carry out this method that allows more precise test results with shorter cycles and a high degree of automation, and allows the tests to be carried out directly at the wafer level.

According to one aspect of the invention, the photosensor to be tested receives at least two independently controllable superposed individual optical stimulation signals with individual optical stimulation signal intensities. This makes use of the basic concept of the linear superposition of the optical stimulation signal intensities of the individual optical stimulation signals. This makes it possible to eliminate the involved calibration procedure with the frequent mounting and removal of a reference sensor and exchange with the photosensor to be tested which yields uncertainty. This allows more precise test results in quality control of the photosensor to be tested and permits quick and economical tests on the wafer level and a high degree of automated quality control. It is particularly advantageous that instead of the cyclical reference measurements, the transmission characteristic of the optical system only has to be calibrated once, and the luminous flux and its change can be measured and evaluated online.

It is particularly advantageous when the individual stimulation signals are superposed in an integrating sphere that preferably has at least one outlet opening for the superposed, individual stimulation signals. When such a light-integrating sphere is used, the individual stimulation signals can be advantageously superposed due to their highly diffuse reflection on the inner wall of the sphere, and they are available there or preferably at (at least) one exit opening to be applied to the photosensor to be tested.

In a first alternative solution, the integrating sphere is optically connected to a reference photosensor for detecting an overall stimulation signal flow created by superposing the individual stimulation signals and assigned to the resulting nominal stimulation signal intensity, whereby the nominal stimulation signal intensity is measured and detected for evaluation purposes with the reference photosensor preferably at the same time as the output signals of the photosensor, whereby their relationship to each other is a measure of the quality of the photosensor to be tested.

In another alternative solution for the photosensor quality control method, the nominal output signals of the photosensor to be tested corresponding to the superposed stimulation signal intensities are calculated using the measured output signals of the photosensor. Their relationship to the measured output signals serves as a measure of the quality of the tested photosensor. In particular, this method makes it very easy to effectively check the integral linearity (INL) of the tested photosensor and the uniformity or homogeneity of the response function of the individual photoelements in a photodiode array.

This is accomplished in a particularly advantageous manner by sequentially measuring the photosensor output signals assigned to possible combinations of individual stimulation signals and recording them for evaluation purposes. An algorithm is used based on multiple linear regression to determine the probable individual stimulation signal intensities $Coef_x$ actually applied to the photosensor and assigned to the individual stimulation signals according to the following equation:

$$R = R_0 + Ctl_{0,i}*Coef_0 + Ctl_{1,i}*Coef_1 + Ctl_{2,i}*Coef_2 + \ldots + Ctl_{n,i}*Coef_n$$

whereby R is the output signal of the photosensor, $R_0$ is the also calculated zero point deviation, $Coef_x$ is the intensity of the coefficient representing the individual stimulation signal x, and $Ctrl_{x,i}$ is a control matrix for the individual stimulation signal x, and where the nominal output signals of the photosensor to be tested corresponding to the superposed individual stimulation signals are then calculated using the equation for all possible combinations of individual stimulation signals, whereby their relationship to the output signals measured at the same stimulation signal intensities is a measure of the linearity of the photosensor to be tested, and the nominal linear signal transmission characteristic of the photosensor to be tested can accordingly be determined.

A particularly meaningful and easy measure of the linearity of the photosensor to be tested can be obtained by calculating an X vector assignable to a Cartesian coordinate system as the quotient from the nominal output signals for a specific combination of individual stimulation signals and the nominal output signals for the combination at which all stimulation signals are superposed, and a Y vector is assigned to the X vector that corresponds to the measured output signals of the photosensor to be tested for the same specific combination of individual stimulation signals, and a line slope and an axis section are calculated from this as a regression parameter by means of linear regression, and the axis section and line slope serve as a measure for the nominal linear signal transmission characteristic of the photosensor to be tested, and the characteristic can be determined solely using two parameters, i.e. the line slope and the axis section.

The above-described procedure for photosensor quality control to determine the INL can also be used to determine the DNL, although the attainable resolution is limited. However, this simple and fast procedure can be used to check the general function of the photosensor and can serve to initially segregate defective sensors. The remaining photosensors can then be checked in a different procedure for potential differential non-linearity.

Accordingly, the problem according to an alternative solution is also solved in that the photosensor has several individual photosensors that provide output signals and are supplied with stimulation signals with an essentially constant, relative, local stimulation and constant, relative, temporal stimulation signal intensity distribution which is continuously changed. In particular, this opens up favorable possibilities for detecting and determining differential non-linearity of such photosensors without requiring a precise knowledge of the level of the output signals or corresponding reference measurements. There can be any kind of local distribution of the stimulation signal intensity over all photosensor elements or pixels, however it should be approximately homogenous to create similar control conditions for all photosensor elements.

For practicality purposes all photosensor elements are simultaneously supplied with the stimulation signals which results in corresponding time advantages with a high degree of automation.

The photosensor elements are advantageously supplied with stimulation signals whose intensity distribution differs locally across the photosensor elements. It is assumed that the individual photosensor elements are controlled similarly but not the same so that potential, level-related errors do not arise simultaneously for all pixels. In this manner, one can discern whether the faults are a result of a faulty input signal or from a defect of the photosensor to be tested.

It is particularly advantageous when the output signals of each photosensor element are measured as offset signals and the associated offset signal values are detected without supplying the stimulation signals; it is also advantageous when the output signals of each photosensor element fed stimulation signals are measured as measuring signals and the associated measuring signal values are determined, and when the respective offset signal values are subtracted from the measuring signal values of each photosensor to provide an offset correction, and the resulting local and time-related nominal output signal values are determined, and when the local and time-related nominal output signal values are then standardized with a location-related intensity value determined from these nominal output signal values, and when a time-related intensity value determined according to a statistical procedure from these data values is subtracted from the resulting location and time-related data values. In that way, taking into account the remaining noise, the deviations from, e.g. established specific threshold values which exceed upper or lower limits due to differential non-linearities, can be determined with regard to position and magnitude for each photosensor element. This procedure takes advantage of statistical and probability calculations, since deviations from normal behavior may be effectively displayed during testing of photosensors with a majority of elements of the same type. The positional and temporal progression of intensities may be compiled from redundant information, so that this information need not be obtained using another more expensive and/or error-prone method.

Because of increased statistical accuracy, it is worthwhile to perform the above steps in the order specified, since generally fewer positional measurement data related to the photosensor are present than temporal data. This means, however, that these steps may also be performed in reverse order.

It is useful that the position-related intensity value for each photosensor element (71, 72, 73) be calculated from the average value of the nominal output signal values of each photosensor element over all measurement periods, and that the time-related intensity value be calculated for each measurement period from the median value of the resulting position- and time-related data values of each measurement period. Use of the average value as a reference value has proved useful for the calculation of the position-related intensity value since it is to be assumed that non-linearity errors arise simultaneously only for individual photosensor elements. The average value, the median value, or the reporting of the maximum from the frequency distribution of the measurement values of all position-related intensity values for any point in time involved are used as reference values for calculation of the time-related intensity value, and for the ideal case in which no differential non-linearity errors arise, these methods all provide the same result. However, for the case in which the measurement data are overlaid by differential non-linearity errors, considerable differences may result so that the selection of the suitable procedure is of high significance. Formation of the average value is not suitable here since many errors may have strong influence on the average value, thus rendering the result inaccurate. The best result is obtained by use of the maximum from the determination of frequency distribution, since it may be assumed that, because of the monitored production procedure, the frequency of data not affected by error exceeds all other frequencies, or that grave defects were detected in the foreground by a simpler testing procedure. This calculation is, however also the most involved. It has been shown that the use of the median value represents a good compromise, since in practice, formation of the median value approximates the determination of the frequency distribution.

For photosensors that produce digital output signals with specified quantification stages, it is useful to select the temporal alteration of the stimulation signal intensity such that a number, or a majority, of measurement values are compiled for each quantification stage. In this manner, a filtration serving to suppress the measurement data noise level followed by a measurement data reduction is possible in order to enable achievement of accurate test results during relatively brief testing cycle times. In order to reduce statistical unreliability, a suitably high, preferably larger number of measurement values would be compiled than would be reported during the measurement of the offset signals from the photosensor elements (71, 72, 73).

Filtration of output signals such as using an FIR- or IIR filter might be performed to reduce and minimize statistical unreliability or deviations, especially the noise level of the measurement values, and the resulting data values thus be determined. For this, the filtering would be conducted in such a manner that regular errors, i.e., inconsistencies in the input/output conversion function of the photosensor being tested caused by differential non-linearities, are maintained. A reduction of data values, preferably to four data values per quantification stage, would be then performed in order to reduce the quantity of data and the testing duration.

According to an advantageous embodiment of the method, the photosensor elements of the photosensor to be tested would be subjected to at least two independent, controllable, overlapping individual stimulation signals with individual stimulation signal intensity.

It would be particularly advantageous if the individual stimulation signals are superimposed into an integrated sphere that preferably includes at least one exit opening for the superimposed individual stimulation signals. In this manner, a favorable opportunity for data preparation for the determination of the DNL is achieved with respect to the positional and temporal progression of stimulation intensities.

For this, it is advantageous if at least the first stimulation signal of the independently-controlled stimulation signals constantly varies throughout the period, and is superimposed on a further individual stimulation signal, whereby the second stimulation signal is transferred from the first switched condition (preferably with zero signal intensity) into a second switched condition with a greater signal intensity. Then the generation of the constantly-varying stimulation signal intensity may be divided into several sections so that additional stimulation signals switchable in stages may be further superimposed onto the constantly-varying stimulation signals. In this manner, the resolution requirements for the constantly-varying stimulation signals may be reduced so that good resolution of the stimulation signal source producing the first stimulation signal is possible in any range. For this, it is immaterial in which stage and in which sequence the switchable stimulation signals are engaged. Further, the measurement need not be temporally connected, but rather can be interrupted from section to section. It is further immaterial whether the variable stimulation signal is constantly increasing or constantly decreasing as it is superimposed.

It would be advantageous if the individual stimulation signals are each produced by a stimulation signal source that includes a control range of possible stimulation signals intensities, and whereby the control range of the first stimulation signal source is greater than the control range of the second stimulation signal source, so that their control ranges overlap. When conducting a procedure with increasing stimulation signal intensity, the control range of the second signal source will overlap at the top, or during a procedure with decreasing stimulation signal intensity, the control range of the second signal source will overlap at the bottom. In this manner it is ensured that no unsteady location is mistakenly induced that otherwise might be interpreted as a photosensor defect.

The device according to the invention for the photosensor quality control method has a stimulation signal source to generate stimulation signals supplying the photosensor that can be adjusted to have different stimulation signal intensities, and a controller coupled to the stimulation signal source to adjust the different stimulation signal intensities, and a measured data detector that can be connected to the photosensor to be tested to measure and detect the output signals of the photosensor, whereby the stimulation signals consist of at least two independently controllable, superposed individual stimulation signals with individual intensities. A highly specialized stimulation signal can be provided for direct quality control of the photosensors to be tested. This device can provide highly automated quality assurance of the photosensors to be tested with tests on the wafer level that yield much less measuring uncertainty than prior test arrangements for photosensor quality assurance. Correspondingly more precise test results can be attained.

It is useful to provide at least two independently controllable stimulation signal sources to generate the individual stimulation signals. This allows a particularly easy and economical test setup.

The stimulation signal source(s) is/are usefully designed with LEDs, whereby each LED preferably emits essentially the same wavelength. Accordingly, a unit consisting of several LEDs can be advantageously created. To check the spectral response function of the tested photosensors, either several such units can be provided with several LEDs, or several subunits with several LEDs can be provided in the unit with LEDs, whereby the LEDs in the individual units or subunits emit light at a specific, i.e., essentially equivalent wavelength. The units or subunits can usefully be designed with red, yellow, green and/or blue LEDs.

It is particularly advantageous when the stimulation signal source is connected to a sphere integrating the individual stimulation signals that preferably has at least one outlet opening for the superposed individual stimulation signals. The integrating sphere is usefully designed as a hollow sphere and has an inner coating with a nearly perfectly diffuse or Lambert-type material, and it is characterized by a particularly strong reflection. Such an integrating sphere allows the individual stimulation signals to be homogeneously superposed in a particularly effective manner due to the highly-diffuse reflection characteristic of the inner wall of the sphere and allows the photosensor to be tested to receive the individual stimulation signals superposed in the integrating sphere in a correspondingly effective manner.

The integrating sphere is advantageously optically connected to a reference photosensor to detect the overall stimulation signal flow formed by superposing the individual stimulation signals and assigned to the resulting stimulation signal intensity. The reference photosensor is arranged so that it only receives the individual superposed stimulation signals preferably reflected only by the integrating sphere, i.e., not directly supplied with the individual stimulation signals. By using this reference photosensor, one can check whether the desired linear relationship of the superposed individual stimulation signals or their stimulation signal intensities is maintained. In addition, the reference photosensor can be used to measure the nominal stimulation signal intensity and relate it to the preferably simultaneously measured output signals of the photosensor to be tested and hence obtain a measure of the quality of the photosensor to be tested. The reference photosensor and the photosensor to be tested hence do not have to be repeatedly mounted and removed as required by the state of the art. However, this type of quality control requires several individual measurements so that the measuring results can still have a relatively large degree of statistical uncertainty.

The integrating sphere is usefully optically connected to at least one optical fiber to receive the superposed individual stimulation signals and send them to the photosensor to be tested. This allows the location where the stimulation signals are generated to be spatially separate from the actual site where the photosensor is measured during manufacture.

It is also useful when a beam former, preferably an optical positive lens, is provided to focus the superposed individual stimulation signals on the surface of the photosensor to be tested. The beam former can be directly connected to the end of the optical fiber that has the photosensor to be tested, or it can be placed between this end of the optical fiber and the photosensor to be tested.

The above measures together and by themselves promote more precise test results with shorter test cycles and with a higher degree of automation, and allow the tests to be carried out directly on the wafer level.

Other features, perspectives and advantages of the invention can be found in the following description that refers to a figure.

Figure 2:
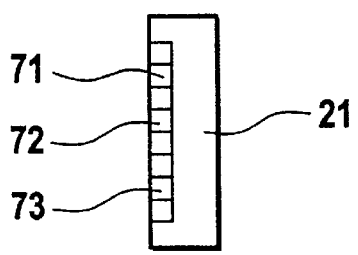
Figure 3:
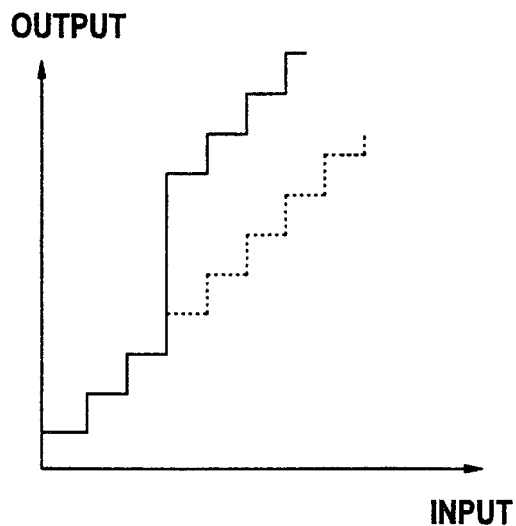

A preferred exemplary embodiment of the invention will be described below with reference to a figure. Shown is:

FIG. 1 A schematic view of the device to implement the photosensor quality control measurements;

FIG. 2 A schematic view of a cross-section of a photosensor with several photosensor elements;

FIG. 3 The input/output signal conversion function of a photosensor that includes a differential non-linearity in the form of "missing codes;"

Figure 4:
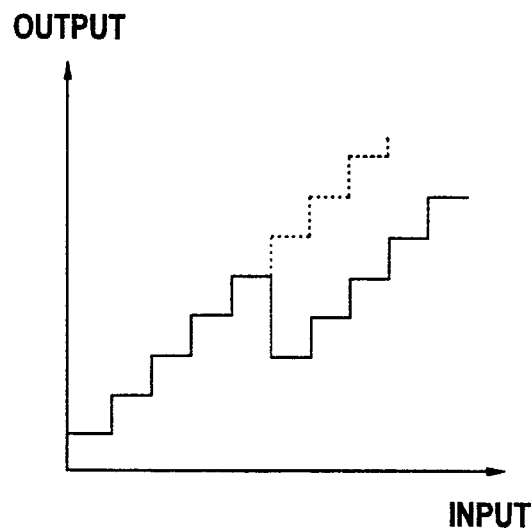

FIG. 4 The input/output signal conversion function of a photosensor that includes a differential non-linearity in the form of "double codes;"

FIG. 5 The input/output signal conversion function of a photosensor that includes a differential non-linearity in the form of a "dead zone;"

Figure 7:
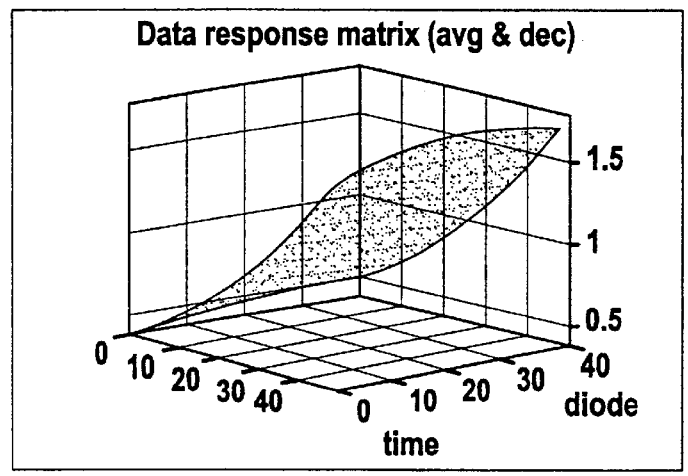
Figure 8:
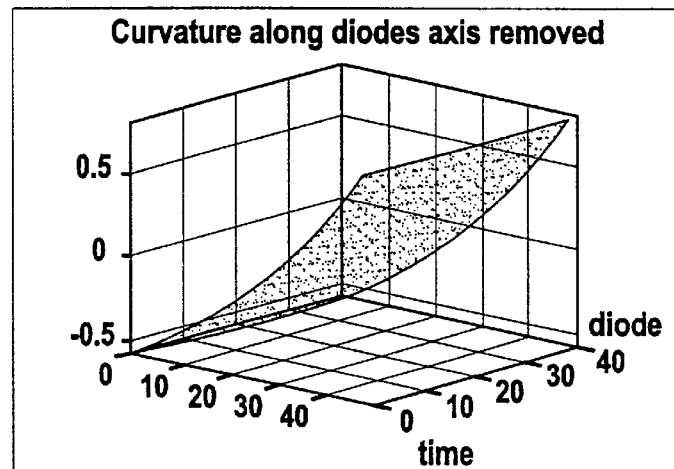
Figure 9:
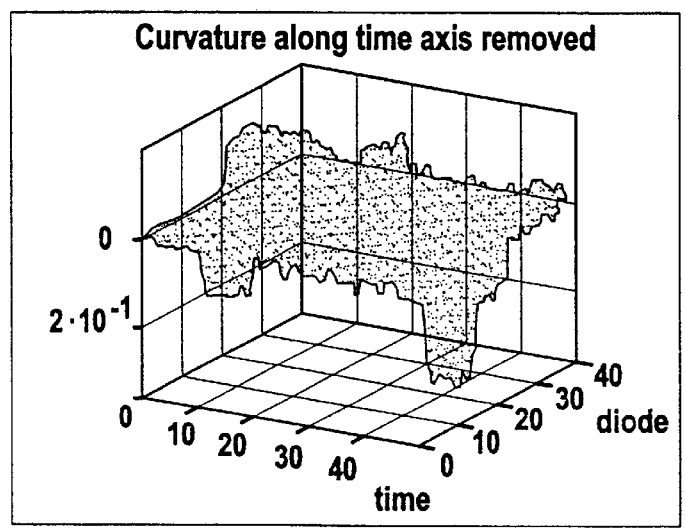
Figure 10:
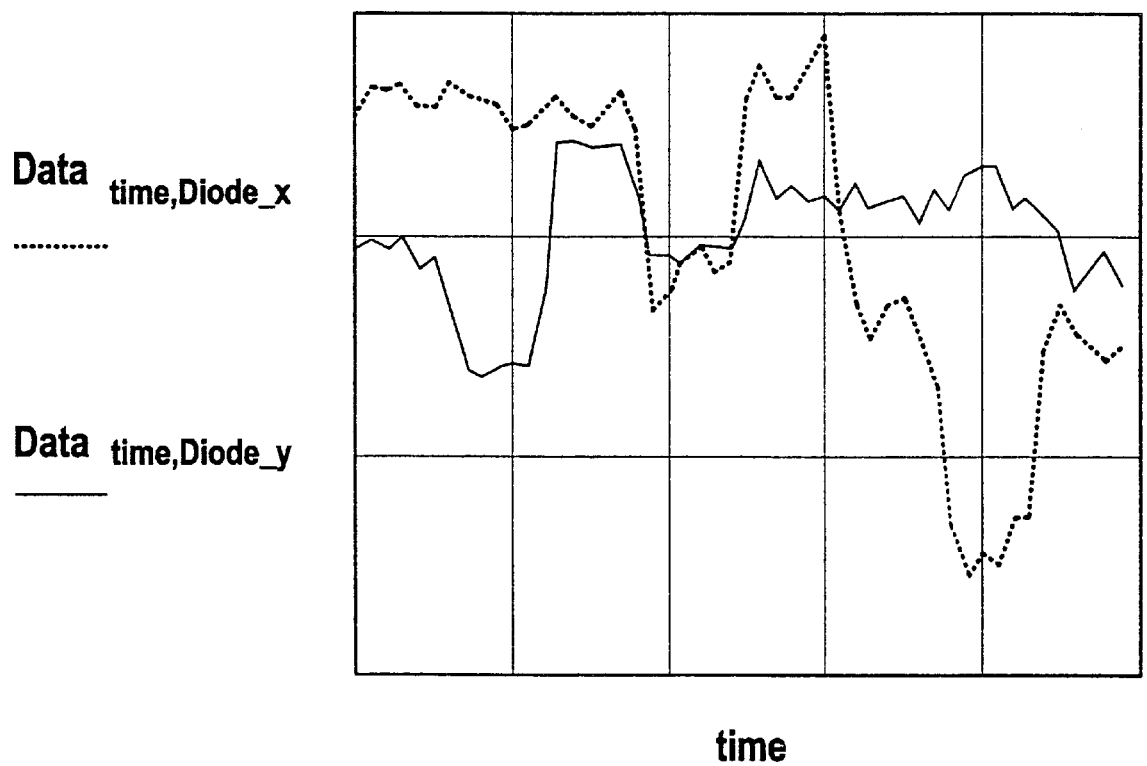

FIG. 6 The ideal input/output signal conversion function of a photosensor with no differential non-linearity;

FIG. 7 A three-dimensional graphical representation of an intensity distribution matrix with respect to time and position-varying photosensor elements, before conduction of an offset correction;

FIG. 8 A three-dimensional graphical representation of an intensity distribution matrix with respect to time and position-varying photosensor elements, after conduction of an offset correction and after calculation of the position curve progression of the intensity distribution function across the photosensor elements;

FIG. 9 A three-dimensional graphical representation of an intensity distribution matrix as in FIG. 8, after calculation of the temporal curve progression of the intensity distribution function;

FIG. 10 The intensity distribution function with respect to time of two photosensor elements after data preparation.

The device 20 for quality control of the photosensor 21 to be tested comprises the sphere 22 that integrates light, the stimulation signal sources 31, 32, 33, 34, the reference sensor 25, the optical fiber 26, the positive lens 27, the controller 55, the measured data recorder 65, and the arithmetic unit 70.

The integrating sphere 22 is designed as a hollow sphere and has an inner surface 23 that has nearly perfect diffuse back reflection or Lambertian properties and permits extremely strong reflection. Due to the highly-diffuse reflection characteristics of its inner wall, the light-integrating sphere 22 homogeneously distributes over the inner surface 23 the light emitted into the sphere from the individual stimulation signal sources 31, 32, 33, 34 and allows a near perfect superposition of the individual stimulation signals 41, 42, 43, 44 generated by the stimulation signal sources 31, 32, 33, 34.

The light emitted by the individual stimulation signal sources 31, 32, 33, 34 in the form of individual stimulation signals 41, 42, 43, 44 is superposed in the integrating sphere in a nearly perfectly diffused manner and reflected inward the form of the superposed individual stimulation signals 46 by the surface 23 of the integrating sphere 22, and the light is available at the outlet opening 24 of the integrating sphere 22 to supply the photosensor 21 to be tested. The same holds true for the reference photosensor 25 in the wall of the integrating sphere 22 that serves for reference and calibration purposes.

The individual stimulation signal sources 31, 32, 33, 34 are arranged or provided with apertures (not shown in FIG. 1) so that the outlet opening 24 and reference photosensor 25 do not directly receive stimulation signals 41, 42, 43, 44 but only the superposed individual stimulation signals 46.

At the outlet opening 24, the integrating sphere 22 is optically connected to the optical fiber 26 to receive the superposed individual stimulation signals 46 and send them to the photosensor 21 to be tested. The free end 29 of the optical fiber 26 is provided with an optical positive lens 27 serving as a beam former to focus the superposed individual stimulation signals 46 in the form of a light spot homogeneously diffused on the surface 28 of the photosensor 21 to be tested. The optical fiber 26 has a numerical aperture illustrated by the angle 39 that is harmonized to the interior of the integrating sphere 22 and the arrangement of the stimulation signal sources 31, 32, 33, 34.

The individual stimulation signal sources 31, 32, 33, 34 are combined to form units 36, 37. Unit 36 has stimulation signal sources 31, 32, and unit 37 has stimulation signal sources 33, 34. The stimulation signal sources 31, 32; 33, 34 combined in units 36 and 37 are formed by a bundle or unit of LEDs. These are placed in the integrating sphere through openings in the sphere 20 (not shown in FIG. 1) and are arranged along the inner wall of the sphere. The LEDs allow the emission of light, i.e., electromagnetic waves, and their intensity can be specifically varied by controlling or setting various electrical voltage values. The LEDs in groups 36 and 37 emit light with a varying wavelength, however, the light is at essentially the same wavelength in the individual units 36, 37. This makes it possible to do the tests at different wavelengths without any modifications. There are advantageously at least two such units in the integrating sphere 22 in addition to the units 36, 37 in FIG. 1 of stimulation signal sources 31, 32; 33, 34. These are usefully designed with blue, green, yellow and red LEDs. Each unit 36, 37 consists of a number of groups, preferably seven groups each that each includes a number of stimulation signal sources 31, 32; 33, 34, hereby the groups are formed and individually controllable using binary or any other weighting The stimulation signal sources 31, 32, 33, 34 are coupled via line 51, 52, 53, 54 to a controller 55. Each stimulation signal source 31, 32, 33, 34 is coupled to a settable current or to an adjustable voltage source and an electrical resistor. By using these resistors, the current flowing through the respective LEDs can be determined or set so that there is a measure for the respective stimulation signal intensity or for the luminous flux emitted by the individual stimulation signal sources 31, 32, 33, 34. The controller 55 comprises a system of electronic switches that can be used to switch on and off each of the individual stimulation signal sources 31, 32, 33, 34 independent of all other stimulation signal sources. There are two or more possible switched states, and each individual stimulation signal source 31, 32, 33, 34 can have stimulation signal intensities settable between logical 0 (off) and logical 1 (on). In addition, each individual stimulation signal source 31, 32, 33, 34 can be supplied with power using the controller 55 so that the individual current intensity can rise or fall continuously and preferably linear.

The controller 55 is connected to the measured data recorder 65 via line 61; the reference sensor 25 is connected via line 62, and the photosensor 21 to be tested is connected via line 63. The recorder also serves to measure and record or store the output signals of the photosensor 21 or reference photosensor 25, and also to detect the different switched states or switching combinations of the individual stimulation signal sources 31, 32, 33, 34 controlled or regulated by the controller 55. The measured data recorder 65 is connected via line 66 to the arithmetic unit 70. This serves to evaluated the setting data and measured data, and especially to calculate the result matrices by the method according to the invention.

The photosensor 21 to be tested can e.g. be a single photoelement or a single photodiode, an arrangement of numerous photodiodes in the form of a photodiode array, i.e., a linear arrangement of photoelements or a diode line, or a matrix consisting of numerous photoelements or photodiodes. FIG. 2 shows a schematic representation of an enlarged cross-section through a photosensor 21 with multiple photosensor elements 71, 72, 73.

In the following, the method for quality control of the photosensor 21 to be tested according to the first alternative proposed solution will be further described. The method is based on the assumption that the light flux from several light sources or stimulation signal sources 31, 32, 33, 34 can be superposed in a linear manner. This means that the overall flow of a selection of stimulation signal sources 31, 32, 33, 34 corresponds to the sum of the signal flow or stimulation signal intensity of each of the individual stimulation signal sources 31, 32, 33, 34. This is the case when interactions between the different individual stimulation signal sources 31, 32, 33, 34 are prevented. Such interactions can be thermal, electrical or mechanical in nature. A thermal interaction can arise when the flow of heat of the respective stimulation signal sources 31, 32, 33, 34 influences the beam emission of a neighboring stimulation signal source 31, 32, 33, 34 or when neighboring stimulation signal sources move due to the influence of the temperature coefficient. Electrical interactions can e.g. be induced when the electrical power consumption of an individual stimulation signal source 31, 32, 33, 34 influences the electrical connection of the other stimulation signal sources 31, 32, 33, 34. Mechanical interactions can e.g. arises from mechanical stress from functional elements and the resulting influence of the optical transmission characteristic. Such interaction effects can be avoided by using LEDs as the stimulation signal sources 31, 32, 33, 34. The LEDs have a very short response time, and they do not generate any (or only a negligible) heat when they are used. In addition, LEDs are particularly easy to directly control electrically by using suitable electronic switching elements. This allows the tests for photosensor 21 quality control to be carried out very quickly, and the sequence of the test programs can be optimally planned and controlled or regulated completely by electronic means.

Assuming an ideal linear superposition of the individual stimulation signals 41, 42, 43, 44 generated by the individual stimulation signal sources 31, 32, 33, 34, the stimulation signal flow generated by the stimulation signal sources or the corresponding stimulation signal intensity can be represented as a function of the switched-on stimulation signal sources for the generalized instance of "n" switched-on or switched-off stimulation signal sources. In the following examples, the logical switching state 0 will be assumed for off and 1 for on for the sake of simplicity. Of course, the use of the algorithm or the method is not limited to these two switching states, rather any discrete switching states can be recorded or handled for each individual stimulation signal source 31, 32, 33, 34. For the above-described approach, the stimulation signal flow formed by superposing the individual stimulation signals or the resulting stimulation signal intensity $I_i$ can be described by the following equation:

$$I_i = Ctl_{0,i} * LS_0 + Ctl_{1,i} * LS_1 + Ctl_{2,i} * LS_2 + \ldots + Ctl_{n,i} * LS_n$$

Where $LS_x$ is the luminous flux or stimulation signal intensity of the stimulation signal source x in the integrating sphere 22 that is measured with the reference photosensor 25, and where $Ctl_{x,i}$ is a control parameter for the individual stimulation signal source x with $Ctl_{x,i} = \{0,1\}$ so that a switched off state is characterized with $Ctl_{x,i} = 0$, and the switched on state is characterized with $Ctl_{x,1} = 1$.

With "n" stimulation signal sources with the two switching states "on" and "off", two $2^n$ different stimulation intensities can be generated. The signal response, i.e., the output signal of the photosensor 21 to be tested and/or the reference sensor 25 measured for all possible combinations of switching states of the individual stimulation signal sources 31, 32, 33, 34 represents a result matrix system consisting of a linear equation system of $2^n$ equations with "n" unknowns.

With the aid of the above equation and using the reference photosensor 25, the linear relationship of the superposed individual stimulation signals 46 created by superposing the individual stimulation signals 41, 42, 43, 44 can be checked by calculating and evaluating the most probable individual stimulation signal intensities $LS_x$ assigned to individual stimulation signals supplying the reference photosensor 25 using a mathematical algorithm based on multiple linear regression.

A first possibility to improve the quality control of a photosensor 21 to be tested is to use the reference photosensor 25 in the integrating sphere 22. By varying the individual stimulation signals 41, 42, 43, 44 generated by the stimulation signal sources 31, 32, 33, 34, the resulting superposed stimulation signals 46 can be measured with the reference photosensor 25 and preferably simultaneously with the photosensor 21 to be tested. For each measuring point, the correlations can be established between the actual values of the superposed stimulation signals 46 measured by the reference photosensor 25 and the output signals of the photosensor 21 to be tested measured at the same superposed stimulation signal intensity or simultaneously to arrive at conclusions on the respective quality of the photosensor 21 to be tested. In addition to the above-described advantages, this method has the disadvantage that the measured values are measured at a high number of individual measuring points with a correspondingly high uncertainty so that the measuring or test precision is not completely satisfactory. For this reason, the method described below for photosensor 21 quality control is preferred.

With this method, the output signals of the photosensor 21 to be tested are used directly to calculate the most probable individual stimulation signal intensities assigned to the individual stimulation signals actually supplying the photosensor 21. The luminous flux or stimulation signal intensity proceeding from the integrating sphere 22 that is actually available at the photosensor 21 to be tested can be represented by the equation:

$$FluxDUT_i = k_0 * I_i$$

where $k_0$ is the optical transmission factor of the device. This factor is determined once as the ratio of the stimulation signal intensities that are measured with the reference photosensor 25 and a calibration sensor that is positioned at the corresponding site or position of the photosensor 21 to be tested.

Based on the above equation, the output signal of the photosensor 21 to be tested can be calculated by the following equation:

$$R_i = k_0 * k_r * [Ctl_{0,i} * LS_0 + Ctl_{1,i} * LS_1 + Ctl_{2,i} * LS_2 + \ldots + Ctl_{n,i} * LS_n] + R_0$$

where $k_r$ is the relative response factor of the photosensor 21 to be tested, and $R_0$ is the likewise calculated zero error. The relative response factor $k_r$ also only has to be determined once.

If the stimulation signal intensities $LS_x$ of the individual stimulation signal sources are replaced in the above equation with:

$$LS_x = Coef_x \text{ by } (k_0 * k_r)$$

then the output signal R of the photosensor 21 can be described by the following equation:

$$R = R_0 + Ctl_{0,1} * Coef_0 + Ctl_{1,i} * Coef_1 + Ctl_{2,i} * Coef_2 + \ldots + Ctl_{n,i} * Coef_n$$

Where $Coef_x$ are the actual individual stimulation signal intensities assigned to the individual stimulation signals that are fed to the photosensor 21 by superposition, and $Ctl_{x,i}$ is a control matrix for the individual stimulation signal x.

With the assistance of this equation, the output signals of the photosensor 21 assigned to the combinations are measured and recorded sequentially for evaluation purposes for all possible combinations of individual stimulation signals 41, 42, 43, 44, and the most probable individual stimulation signal intensities $Coef_x$ assigned to the individual stimulation signals that are actually fed to the photosensor 21 are calculated using a mathematical algorithm based on multiple linear regression according to the above equation. Then, with the aid of this equation, the nominal output signals of the photosensor 21 to be tested corresponding to the superposed individual stimulation signals 46 are calculated for all possible combinations of individual stimulation signals 41, 42, 43, 44, whereby their relationship to the measured output signals with the same stimulation signal intensities is a measure of the linearity of the photosensor 21 to be tested. The measured data of the output signals of the photosensor 21 to be tested are hence determined using an equation system with n+1 unknowns (including $R_0$), but with $2^n$ independent equations so that the number of equations is determined by all possible combinations of the control function $Ctl_{x,i}$.

The relative response factor $k_r$ can be determined once as a quotient from the $Coef_x$ determined with the aid of the photosensor 21 to be tested, and $Coef_x$ determined with the calibration photosensor 21.

The calculated and measured data for determining the linearity or linearity function of the photosensor 21 to be tested can be evaluated in a particularly easy and effective manner when an X vector assigned to a Cartesian coordinate system is calculated as the quotient from the calculated nominal output signals for a specific combination of individual stimulation signals 41, 42, 43, 44, and the calculated nominal output signals for the combination at which all stimulation signals 41, 42, 43, 44 are superposed. The nominal output signal of the tested photosensor 21 normalized to the maximum intensity is used as the X vector. The Y vector is the measured output signal of the photosensor 21 to be tested corresponding to the equivalent determined combination of individual stimulation signals 41, 42, 43, 44. Using these two vectors, a line slope and an axis section are calculated as a regression parameter by means of linear regression, and the axis section and line slope serve as a simple and effective measure for the nominal linear signal transmission characteristic of the photosensor 21 to be tested. In addition, the relative error characteristic of the photosensor to be tested 21 can be easily determined by comparing the measured output signals with the nominal output signals.

The spectral response function of the photosensor 21 can be tested as described above using the differently colored LEDs collected in several units 36, 37. The measured output signals of the photosensor 21 to be tested can be related to the output signals measured with the reference photosensor 25 taking into account transfer factor $k_0$. If in addition the ratio of the sensor surfaces of the calibration photosensor and the reference photosensor 25 and the calibration data of the calibration photosensor are taken into account, the measurement results can be portrayed as absolute quantities.

The uniformity or homogeneity of the response function of a photosensor or photodiode array and the noise level and drift of the photosensor 21 to be tested can also be easily checked using the device 20 according to the invention. The differential non-linearities of the photosensor 21 to be tested can be determined by running the entire intensity range step by step corresponding to the full-scale deflection of the photosensor 21 to be tested using the stimulation signal sources that can be turned on and off in the form of numerous LEDs; the intensity of the optical stimulation signal is continuously (preferably linearly) increased or decreased between the individual discrete intensity steps by correspondingly changing the power supply to a stimulation signal source.

This preferred procedure used to determine the differential non-linearities of a photosensor 21 formed of several photosensor elements 71, 72, 73 in accordance with the second proposed alternative solution will now be described in more detail. The above-described configuration will preferably be used to perform this procedure. For this, a signal stimulation source will be used that consists of $2^n$ switchable stimulation signal sources 31, 32, 33 preferably with binary-weighted staging and a variable stimulation signal source 34. In this manner, almost equal stages may be achieved by the use of $2^n$ combinations. Weighting of the individual stimulation signal sources 31, 32, 33, 34 may be achieved by parallel connection of several stimulation signal sources of the same type, preferably LEDs. A stimulation signal source with a constantly-varying stimulation signal intensity is thus realized by altering the current through the stimulation signal source (i.e., its control) is constantly altered, preferably linearly. This implies that the stimulation signal intensity created by the stimulation signal source 34, i.e., its output, will also change continuously, whereby it is immaterial whether a linear dependence between control and output exists. Based on the recommended procedure, it is also immaterial if a stimulation signal source drifts because of thermal or other influencing factors. The temporal intensity progression need not absolutely be linear, and the intensity distribution across pixels need not be homogenous.

Stimulation signal sources may be connected individually or in groups independently of one another. The weighting of groups is advantageously staged in a binary manner so that $2^n$ connection combinations are possible, while the staging is approximately evenly distributed over the whole control range. The control range of the variable stimulation signal source 34, i.e., that range between a minimum and a maximum value of the achievable stimulation signal intensity is so selected that it is greater than the control range of the switchable stimulation signal sources 31, 32, 33 that overlap it. In this manner, threshold area inconstancies in the resulting stimulation signal intensity of the superimposed stimulation signals 46 are avoided.

Use of the above-described configuration 20 allows creation of super-imposed individual stimulation signals 46 with a relatively constant relative positional stimulation signal distribution at the exit aperture 24 and on the surface 28 of the photosensor 21 consisting of several photosensor elements 71, 72, 73. Further, a positionally distinct and temporally similar progression of stimulation signal intensity of the stimulation signals across the photosensor elements 71, 72, 73 may be achieved using this configuration 20.

For quality control monitoring, particularly regarding the differential non-linearity of the photosensor 21 to be tested, all photosensor elements 71, 72, 73 are preferably simultaneously subjected to stimulation signals 46 that have mainly constant relative positional stimulation signal intensity distribution. During this, the stimulation signal intensity of the stimulation signals with mainly constant relative temporal stimulation signal intensity distribution is constantly altered. This may also be advantageously achieved by the use of the integrating sphere 22.

Accordingly, the individual connection combinations are sequentially switched for conduction of the quality control monitoring of the photosensor 21, and the control range of the variable stimulation signals 34 is constantly covered during each switching sequence. At the same time, measurement data are continuously compiled and stored. The measurement data are now compiled into a matrix with row-oriented temporal dimension and column-oriented positional dimension assigned to the individual photosensors 71, 72, 73.

The embodiment example delivers digital output signals in specified quantification stages from the photosensor 21 consisting of several photosensor elements 71, 72, 73. The temporal variation, i.e., the alteration rate of stimulation signal intensity of stimulation signal 46 is so selected that a number (e.g., 10) of measurement values per quantification stage is compiled. The necessary resolution is thus achieved, allowing significant filtering of the measurement data in order to achieve a minimization of statistical uncertainty or deviations (the noise level). This implies that this filtering must be so performed that regular errors, particularly the differential non-linearity of each photosensor 21 corresponding to inconstancies remain, since these are what are to be determined. FIR (Finite Impulse Response) filters that operate according to the principle of sliding average formation, or IIR (Infinite Impulse Response) filters are suitable to filter the photosensor 21 producing the output signals. Then a reduction to preferably four measurement values per quantification stage is performed in order to minimize the testing period and to reduce the quantity of measurement data to a reasonable amount. The resulting measurement data matrix is shown in FIG. 7, whereby the output signal intensity is shown with respect to time and to individual photosensor elements.

Before further data preparation may occur, a correction of the dark or offset output signal from photosensor elements 71, 72, 73 is performed. For this, the output signal from each of the photosensor elements 71, 72, 73 is measured without the influence of stimulation signals, and the corresponding offset signals are compiled. Thus, a larger number of measurement values is advantageously compiled, enabling a reduction of statistical uncertainty by the use of averaging. Then the corresponding offset signal values are subtracted from the measurement values assigned to the individual photosensor elements 71, 72, 73 attained when they are subjected to stimulation signals, and the resulting nominal output signal values are compiled into a positional and temporal matrix.

Data preparation used to determine the differential non-linearity is then performed. Thus, all positionally and temporally-related nominal output signal values are standardized with a positionally-related intensity value using a statistical process applied to these nominal output signal values, and then the temporally-related intensity value is subtracted from the resulting positionally and temporally-related data values using a statistical process.

This means that the curve progression covering the photosensor elements 71, 72, 73 is eliminated. For this, the positionally or photosensor element-related intensity value for each photosensor element 71, 72, 73 is calculated from the average value of the nominal output signal values for each photosensor element for all measurement intervals and an average positionally-related vector is formed from these data. Then the corresponding average positionally-related intensity value is subtracted from each of the data values resulting from the offset correction data values, and the result is divided by the corresponding average positionally-related intensity value. The resulting data values are compiled or stored. The resulting matrix is shown in FIG. 8.

Then the curve progression with respect to time is eliminated. For this, the temporally-related intensity value is then calculated as the average value of the resulting positionally- and temporally-related data values for each individual measurement interval for all positionally-related intensity values. Then the corresponding temporally-related intensity values (the average) are subtracted from each of the previously-determined resulting positionally- and temporally-related data values. The resulting values are then again compiled or stored. In this manner, the resulting matrix shown in FIG. 9 is obtained. The matrix elements now only represent values of the magnitude of the remaining noise level and additional deviations based on differential non-linearities. FIG. 10 shows, for example, the intensity distribution function of two photosensor elements with respect to time. The position and size of the differential errors for each individual photosensor element 71, 72, 73 may be determined with the help of a threshold value checking method, for example.

The described procedure considerably reduces testing duration and the associated costs. The requirements of the configuration are moderate, which works to advantage in practice regarding operation and servicing. Further advantages of the procedure based on the invention are listed below in detail: No expensive referencing or exact measurement of the optical stimulation signals is required; no high requirements for positional and temporal progression of the stimulation signal; the procedure is insensitive to temporal instability of the stimulation signal; control and measurement may be interrupted or broken into sections as necessary; there is no consequent utilization of redundant information used to determine the position temporal progression of the optical stimulation signal; there are no special requirements for accuracy of the switchable and variable stimulation signal sources.

What is claimed is:

1. A method of testing a photosensor, that derives an output signal dependent on the intensity of an input signal formed by electromagnetic waves, comprising causing the photosensor being tested to receive optical stimulation signals forming the input signals while varying the optical stimulation signal intensity of the optical stimulation signals incident on the photosensor, and measuring the associated output signals of the photosensor being tested for evaluation purposes, whereby the photosensor being tested receives at least two independently controlled superposed individual optical stimulation signals with individual optical stimulation signal intensities.

2. A method of testing a photosensor according to claim 1, further including causing the individual optical stimulation signals to be superposed on a reflecting spherical surface having at least one exit opening through which the superposed, individual optical stimulation signals pass.

3. A method of testing a photosensor according to claim 2, wherein the integrating sphere is optically connected to a reference photosensor that detects an overall optical stimulation signal flow created by superposing the individual optical stimulation signals, the overall stimulation signal flow being indicative of a resulting nominal optical stimulation signal intensity, and measuring the resulting nominal optical stimulation signal intensity for evaluation purposes with the reference photosensor at the same time as the output signals of the photosensor are measured; whereby a relationship of the resulting nominal optical stimulation signal intensity to the output signal of the photosensor is a measure of the quality of the photosensor being tested.

4. A method of testing a photosensor according to claim 1, wherein nominal output signal of the photosensor being tested corresponding to the superposed optical stimulation signal intensities are calculated using the measured output signals of the photosensor, whereby a relationship between the calculated intensities to the measured output signals is a measure of the quality of the photosensor being tested.

5. A method of testing photosensor according to claim 4, further including measuring the output signals of the photosensor assigned to all possible combinations of individual optical stimulation signals for evaluation purposes sequentially for all possible combinations of individual optical stimulation signals, and calculating the most probable individual optical stimulation signal intensities $Coef_x$ assigned to the individual optical stimulation signals and actually applied to the photosensor using an algorithm based on multiple linear regression according to the equation:

$$R = R_0 + Ctl_{0,i} * Coef_0 + Ctl_{1,i} * Coef_1 + Ctl_{2,i} * Coef_2 \ldots Ctl_{n,i} * Coef_n$$

where R is the output signal of the photosensor, $R_0$ is the calculated zero point deviation, $Coef_x$ is the intensity of the coefficient representing the individual optical stimulation signal x, and $Ctl_{x,i}$ is a control matrix for the individual optical stimulation signal x, and then calculating the nominal output signals of the photosensor being tested corresponding to the superposed individual optical stimulation signals using the equation for all possible combinations of individual stimulation signals, whereby a relationship of the calculated nominal output signals to the output signals measured at the same optical stimulation signal intensities is a measure of the linearity of the photosensor to be tested.

6. A method of testing photosensor according to claim 5, further comprising calculating an X vector assigned to a Cartesian coordinate system as a quotient from the nominal output signals for a specific combination of individual optical stimulation signals and the nominal output signals for the combination at which all optical stimulation signals are superposed, and assigning a Y vector to the X vector that corresponds to the measured output signals of the photosensor being tested for the same specific combination of individual optical stimulation signals, and calculating a line slope and an axis intersection from this as a regression parameter by nominal linear signal transmission characteristic of the photosensor being tested.

7. A method of testing a photosensor, the photosensor being a photodiode array, whose output signal depends on the intensity of an optical input signal formed by electromagnetic waves, comprising the steps of causing the photosensor being tested to receive optical stimulation signals forming the input signals while varying the optical stimulation signal intensity of the optical stimulation signals, and measuring the associated output signals of the photosensor being tested for evaluation purposes, the photosensor being tested including several photosensor elements providing individual output signals, causing the several photosensor elements to receive optical stimulation signals with basically constant relative positional and temporal distribution of its optical stimulation signal intensity while the optical stimulation signal is constantly varying.

8. A method of testing a photosensor according to claim 7, wherein the photosensor elements receive optical stimulation signals whose optical signal intensity has positionally-varying distribution across the photosensor elements.

9. A method of testing a photosensor according to claim 7, further comprising measuring the output signals of each photosensor element without reception of optical stimulation signals as offset signals and compiling corresponding offset signal values, and measuring the output signals of each photosensor element as measurement signals when receiving optical stimulation signals, and subtracting the offset signal values from the measurement signals of each photosensor element and compiling the resulting positionally- and temporally-related nominal output signal values, and then standardizing the positionally- and temporally-related nominal output signal values by using a positionally-related intensity value determined from a statistical process performed on these data values by subtracting from the resulting positionally- and temporally-related values.

10. A method of testing a photosensor according to claim 9, wherein the positionally-related intensity value for each photosensor element is calculated from the average value of the nominal output signal values of each photosensor element across all measurement intervals, and that the temporally-related intensity value for each measurement interval is calculated from the median value of the resulting positionally- and temporally-related data values of that measurement interval.

11. A method of testing a photosensor according to claim 9, wherein the photosensor elements produce digital output signals with specific quantification stages and selecting the temporal variation of the optical stimulation signal intensity so that a number of measurement values per quantification stage is determined.

12. A method of testing a photosensor according to claim 11, wherein a correspondingly high number of measurement values is compiled during measurement of the offset signals of the photosensor elements.

13. A method of testing a photosensor according to claim 9 further including filtering the output signals before or after the offset correction using a FTR and IIR filter, and compiling the resulting data values.

14. A method of testing a photosensor according to claim 7, wherein the photosensor elements of the photosensor being tested are optically stimulated by at least two independently controlled individual overlapping optical signals with individual optical stimulation signal intensity.

15. A method of testing a photosensor according to claim 14, wherein the individual optical stimulation signals are super-imposed within an integrating sphere that includes at least one exit opening through which the super-imposed individual optical stimulation signals pass.

16. A method of testing a photosensor according to claim 14, wherein at least one first optical stimulation signal of the independently-controllable optical stimulation signals varies constantly over time and is super-imposed with a second individual optical stimulation signal, whereby the second individual stimulation optical signal is transferred from an initial switching status, at signal intensity zero, to a second switching status with a greater signal intensity.

17. A method of testing a photosensor according to claim 16, wherein the individual optical stimulation signals are each created from an optical stimulation signal source, each including a control range of possible optical stimulation signal intensities, and whereby the control range of the first optical stimulation signal source is larger than the control range of further optical stimulation signal sources and overlaps their control ranges.

18. A device for carrying out the method according to claim 1 for testing a photosensor with an optical stimulation signal source to generate optical stimulation signals for supplying the photosensor, the stimulation signal source being adjustable to have different optical stimulation signal intensities, the device including a controller coupled to the optical stimulation signal source for adjusting the different optical stimulation signal intensities, and a measured data detector that can be connected to the photosensor to be tested for measuring and detecting the output signals of the photosensor, the optical stimulation signals being arranged for including at least two independently controllable, superposed individual optical stimulation signals with individual optical stimulation signal intensities.

19. A device according to claim 18, wherein at least two independently controllable optical stimulation signal sources are provided for generating the individual optical stimulation signals.

20. A device according to claim 18, wherein the optical stimulation signal source includes LEDs for emitting optical energy with essentially the same wavelength.

21. A device according to claim 18, wherein the optical stimulation signal source is coupled with a spherical reflecting surface for integrating the individual optical stimulation signals and has at least one outlet opening for the superposed individual optical stimulation signals.

22. A device according to claim 21, wherein the integrating spherical surface is optically connected to a reference photosensor for detecting an overall optical stimulation signal flow created by superposing the individual optical stimulation signals and assigned to the resulting optical stimulation signal intensity, and the reference photosensor is arranged so that it only receives the super-imposed individual optical stimulation signals.

23. A device according to claim 21, wherein the integrating spherical surface is connected to at least one optical fiber for receiving the superposed individual optical stimulation signals and sending them to the photosensor to be tested.

24. A device according to claim 19, further including a beam former for focusing the super-imposed individual optical stimulation signals on a surface of the photosensor to be tested.

25. A method of testing a photosensor having an output signal dependent on the intensity of an incident electromagnetic wave, the method comprising causing plural spatially superposed electromagnetic waves to be incident on the photosensor, independently varying the intensity of the plural superposed waves incident on the photosensor, the photosensor deriving an output signal dependent on the intensity of the superposed electromagnetic waves incident thereon, and detecting variations in the photosensor output signal in response to the varying superposed electromagnetic waves incident on the photodetector.

26. The method of claim 25 wherein the individual superposed electromagnetic waves are incident on an internal surface of an integrating sphere having at least one exit opening for the superposed waves, causing the waves incident on the spherical reflecting surface to pass through the exit opening and thence to be incident as the superposed waves on the photosensor.

27. The method of claim 25 wherein the photosensor is one photosensor of a photosensor array including plural photosensors, the causing step including causing at least some of the plural photosensors of the array to be responsive to the superposed constantly varying intensity electromagnetic waves, the superposed constantly varying intensity electromagnetic waves incident on the plural photosensors having constant positional distribution as a function of time.

28. The method of claim 27 wherein the at least some of the plural photosensors of the array are simultaneously responsive to the superposed constantly varying intensity electromagnetic waves.

29. The device of claim 18, wherein the stimulation signal source includes plural sources of optical energy, a spherical reflecting surface for integrating the optical energy of the plural sources of optical energy, the plural optical energy sources being positioned in the confines of the spherical surface for causing the optical energy from the plural optical energy sources to be superposed on a region of the spherical surface, the photosensor being adapted to be positioned to be responsive to the superposed optical energy from the region of the spherical surface.

30. The device of claim 29, wherein the plural optical energy sources are positioned on the spherical surface.

31. A device for testing a photosensor comprising plural sources of optical energy, a spherical reflecting surface for integrating the optical energy of the plural sources of optical energy, the plural optical energy sources being positioned in the confines of the spherical surface so that the optical energy from the plural optical energy sources is superposed on a region of the spherical surface, the photosensor being adapted to be positioned to be responsive to the superposed optical energy from the region of the spherical surface.

32. The device of claim 31, wherein the plural optical energy sources are positioned on the spherical surface.

33. The device of claim 32, further including a controller for separately varying the intensity of the optical energy derived from different ones of the plural optical energy sources.

34. The device of claim 33, further including an optical fiber having one end positioned at the region so the superposed optical energy from the plural sources is incident on the one end, the optical fiber having a second end positioned to direct optical energy propagating through the optical fiber to the photosensor.

35. A device for testing a photosensor comprising plural sources of optical energy, the plural optical energy sources being positioned and arranged so that the optical energy from the plural optical energy sources is superposed on a region, the photosensor being adapted to be positioned to be responsive to the superposed optical energy from the region, and a controller for separately varying the intensity of the optical energy derived from different ones of the plural optical energy sources.

36. The device of claim 35, further including a spherical reflecting surface for integrating the optical energy of the plural sources of optical energy, the plural optical energy sources being positioned in the confines of the spherical surface, wherein the region is on the spherical surface.

37. The device of claim 36, further including an optical fiber having one end positioned at the region so the superposed optical energy from the plural sources is incident on the one end, the optical fiber having a second end positioned to direct optical energy propagating through the optical fiber to the photosensor.

38. The device of claim 37, wherein the plural optical energy sources are positioned on the spherical surface.

39. The device of claim 36, wherein the plural optical energy sources are positioned on the spherical surface.

40. The method of claim 25, further including responding to the variations in the photosensor output signal to derive an indication of the quality of the photosensor.

* * * * *